US006725013B1

(12) United States Patent
Chang et al.

(10) Patent No.: US 6,725,013 B1
(45) Date of Patent: Apr. 20, 2004

(54) COMMUNICATION SYSTEM HAVING FREQUENCY REUSE IN NON-BLOCKING MANNER

(75) Inventors: Donald C. D. Chang, Thousand Oaks, CA (US); Weizheng Wang, Rancho Palos Verdes, CA (US); Ying Feria, Manhattan Beach, CA (US); Ming U. Chang, Rancho Palos Verdes, CA (US); Harold A. Rosen, Santa Monica, CA (US); Wah L. Lim, Newport Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 345 days.

(21) Appl. No.: 09/594,375

(22) Filed: Jun. 15, 2000

(51) Int. Cl.[7] .......... H04B 7/185

(52) U.S. Cl. .......... 455/13.1; 455/447; 455/63; 455/431; 455/427; 455/3.02; 455/12.1; 455/45; 455/98; 343/265; 343/266; 343/816; 342/368; 342/354; 342/359

(58) Field of Search .......... 455/447, 63, 431, 455/427, 13.1, 3.02, 12.1, 45, 98, FOR 215, 3.2; 343/765, 766, 816; 342/354, 359, 368

(56) References Cited

U.S. PATENT DOCUMENTS

| | | | |
|---|---|---|---|
| 5,444,449 | A | 8/1995 | Poskett et al. |
| 5,555,257 | A | 9/1996 | Dent |
| 5,584,047 | A | 12/1996 | Tuck |
| 5,592,481 | A | 1/1997 | Wiedeman et al. |
| 5,594,941 | A | 1/1997 | Dent |
| 5,678,174 | A | 10/1997 | Tayloe |
| 5,894,590 | A | 4/1999 | Vatt et al. |
| 5,903,549 | A | 5/1999 | von der Embse et al. |
| 5,946,603 | A | 8/1999 | Ibanez-Meier et al. |
| 5,949,766 | A | 9/1999 | Ibanez-Meier et al. |

(List continued on next page.)

FOREIGN PATENT DOCUMENTS

| | | | |
|---|---|---|---|
| DE | 196 29 744 | A1 | 2/1997 |
| EP | 0 549 220 | A | 6/1993 |
| EP | 0748 062 | | 12/1996 |
| EP | 0887 951 | | 12/1998 |
| JP | 59-97239 | | 6/1984 |
| JP | 08-331030 | | 12/1996 |
| WO | WO 90/13186 | | 11/1990 |
| WO | WO 96 31016 | A | 10/1996 |
| WO | WO 97/07609 | | 2/1997 |
| WO | WO 98/51568 | | 11/1998 |
| WO | WO 9913598 | * | 3/1999 |
| WO | WO 99 13598 | A | 3/1999 |
| WO | WO 99 23769 | A | 5/1999 |
| WO | WO 00/41340 | | 7/2000 |
| WO | WO 01/97406 | A3 | 12/2001 |

OTHER PUBLICATIONS

U.S. patent application Ser. No. 09/612,465, Wang et al., filed Jul. 7, 2000.

U.S. patent application Ser. No. 09/594,374, Chang et al., filed Jun. 15, 2000.

U.S. patent application Ser. No. 09/649,355, Hagen et al., filed Aug. 28, 2000.

(List continued on next page.)

*Primary Examiner*—Sinh Tran
*Assistant Examiner*—David Nguyen
(74) *Attorney, Agent, or Firm*—V. D. Duraiswamy; M. W. Sales

(57) ABSTRACT

A communications system (10) and method of operating the communications system includes a high altitude communication device (12) that communicates with a plurality of user terminals and a gateway station (30). The gateway station (30) couples the users to terrestrial networks (32) and other users. The high altitude communication device (16) has a controller that generates a second beam having the first frequency to a service (26). The stratospheric platform (12) does not generate the second beam within a blocking area. User terminals within the service area outside the blocking area are configured to receive the first beam and the second beam.

18 Claims, 4 Drawing Sheets

22
12
16
24
18
14
20

U.S. PATENT DOCUMENTS

| | | | | |
|---|---|---|---|---|
| 5,974,317 A | | 10/1999 | Djuknic et al. | |
| 5,974,324 A | | 10/1999 | Henson | |
| 5,990,928 A | | 11/1999 | Sklar et al. | |
| 6,002,935 A | | 12/1999 | Wang | |
| 6,019,318 A | | 2/2000 | Cellier et al. | |
| 6,023,463 A | | 2/2000 | Wiedeman et al. | |
| 6,040,798 A | | 3/2000 | Kinal et al. | |
| 6,047,186 A | | 4/2000 | Yu et al. | |
| 6,061,562 A | | 5/2000 | Martin et al. | |
| 6,105,060 A | * | 8/2000 | Rothblatt | 709/219 |
| 6,126,116 A | | 10/2000 | Cellier | |
| 6,138,012 A | | 10/2000 | Krutz et al. | |
| 6,151,308 A | | 11/2000 | Ibanez-Meier et al. | |
| 6,167,263 A | | 12/2000 | Campbell | |
| 6,169,910 B1 | | 1/2001 | Tamil et al. | |
| 6,173,178 B1 | | 1/2001 | Hammill et al. | |
| 6,178,328 B1 | | 1/2001 | Tang et al. | |
| 6,188,896 B1 | | 2/2001 | Perahia et al. | |
| 6,205,320 B1 | | 3/2001 | Coleman | |
| 6,208,626 B1 | | 3/2001 | Brewer | |
| 6,215,776 B1 | | 4/2001 | Chao | |
| 6,236,834 B1 | * | 5/2001 | Poskett et al. | 455/13.1 |
| 6,311,068 B1 | | 10/2001 | Leung et al. | |
| 6,317,420 B1 | | 11/2001 | Schiff | |
| 6,324,398 B1 | | 11/2001 | Lanzerotti et al. | |
| 6,325,332 B1 | | 12/2001 | Cellier et al. | |
| 6,327,523 B2 | | 12/2001 | Cellier | |
| 6,333,924 B1 | | 12/2001 | Porcelli et al. | |
| 6,339,708 B1 | | 1/2002 | Wang | |
| 6,389,336 B2 | | 5/2002 | Cellier | |
| 6,567,052 B1 | | 5/2003 | Wang et al. | |
| 2002/0006795 A1 | | 1/2002 | Norin et al. | |
| 2002/0041575 A1 | | 4/2002 | Karabinis et al. | |

OTHER PUBLICATIONS

K. K. Chan, et al., "A Circularly Polarized Waveguide Array for Leo Satellite Communications", Antennas and Propagation Society, 1999, IEEE International Symposium, vol. 1, Jul. 11–16, 1999, pp. 154–157.

M. Oodo, et al, "Onboard DBF Antenna for Stratospheric Platform", 2000 IEEE International Conference on Phased Array Systems and Technology, Proceedings, May 21–25, 2000, pp. 125–128.

R. Suzuki, et al., "Mobile TDM/TDMA System with Active Array Antenna", Global Telecommunications Conference, 1991; GLOBECOM '91; Dec. 2–5, 1991, pp. 1569–1573, vol. 3.

Yokosuka Research Park, "The First Stratospheric Platform Systems Workshop", May 12–13, 1999, pp. 1–216.

U.S. patent application Ser. No. 09/718,973, Wang et al., filed Nov. 21, 2000.

Colella, Nocholas J. et al., "High–Speed Internet Access via Stratospheric HALO Aircraft", INET'99 Proceedings, http://www.isoc.org/conferences/inet/99/proceedings/index.htm, 4. Technology, Wireless, Jun. 8, 1999.

U.S. patent application Ser. No. 09/346,444, Wang et al., filed Jul. 1, 1999.

Colella N J et al., "The HALO Network ™", IEEE Communications Magazine, IEEE Service Center, Piscataway, N.J. U.S., vol. 38, No. 6, Jul. 2000, pp. 142–148, XP0009326557, ISSN: 0163–6804.

* cited by examiner

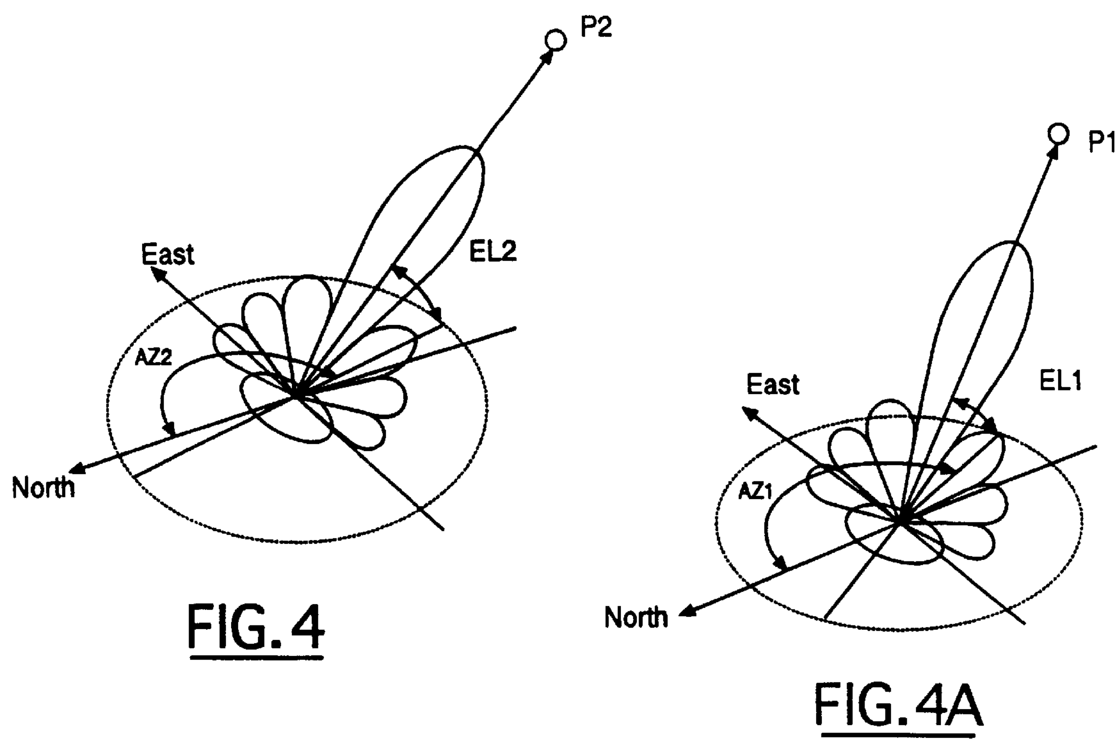
FIG. 4
FIG. 4A
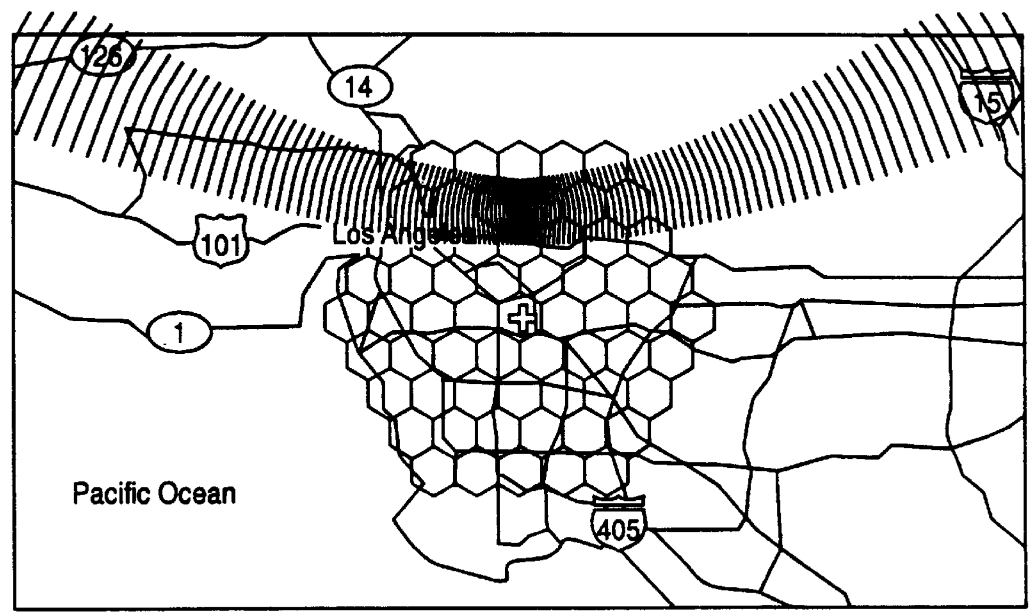
FIG. 5

COMMUNICATION SYSTEM HAVING FREQUENCY REUSE IN NON-BLOCKING MANNER

RELATED APPLICATION

The present application is related to U.S. Patent Application Ser. No. 09/584,374 entitled "Communication System Supporting Multiple Service Providers" filed simultaneously herewith and incorporated by reference hereby.

TECHNICAL FIELD

The present invention relates generally to communications systems, and more particularly, to a system allowing frequency reuse with existing systems in a non-blocking manner.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, satellites transmit and receive large amounts of signals used in either a "bent pipe" or "spot array" configuration to transmit signals to desired geographic locations on the earth.

Because the frequency of resources are scarce for over-the-air transmission, various encoding schemes are used to provide a greater number of communication signals within an allocated communication band spectrum. Such encoding schemes include code division multiple access (CDMA), time division multiple access (TDMA), frequency division multiple access (FDMA), or combination of these schemes. Further, to prevent interference the schemes may operate at various frequencies.

There is a continual need to provide new systems. However, if no spectrum is available typically potential system operators must forgo a pursuing a system. Typically, the same spectrum can not be assigned to different systems because of the potential for interference of the communications signals.

It would therefore be desirable to provide a system that allows reuse of frequency spectrums allocated to other systems in a non-blocking manner.

SUMMARY OF THE INVENTION

It is therefore one object of the invention to provide an improved communications system that allows frequency reuse in a manner which prevents interference with existing systems.

In one aspect of the invention, a method for operating a communication system comprises the steps of:

defining a service area having a blocking area therein, said blocking area having a separation angle between a first position of the satellite and a second position of the stratospheric platform less than a predetermined angle;

generating a first beam using a first frequency directed at the service area with the satellite; and generating a second beam using the first frequency directed at the service area outside the blocking area from the stratospheric platform.

In a further aspect of the invention, a communications system includes a high altitude communication device that communicates with a plurality of user terminals and a gateway station. The gateway station couples the users to terrestrial networks and other users. The high altitude communication device has a controller that generates a second beam having the first frequency to a service area. The stratospheric platform does not generate the second beam within a blocking area. User terminals within the service area and outside the blocking area are configured to receive the first beam and the second beam.

One advantage of the invention is that the user terminals for existing systems may be reused. Another advantage of the system is that several users platforms reusing the as frequency spectrum may be employed within the system.

Other objects and features of the present invention will become apparent when viewed in light of the detailed description of the preferred embodiment when taken in conjunction with the attached drawings and appended claims.

BRIEF DESCRIPTION OF THE DRAWINGS

FIGS. 4 and 4A are plots illustrating two elevation angles between a first terminal and a second terminal FIG. 5 is a rectangular map of the Los Angeles area illustrating a service area and a plurality of blocking areas forming a band.

BEST MODES FOR CARRYING OUT THE INVENTION

Figure 1:
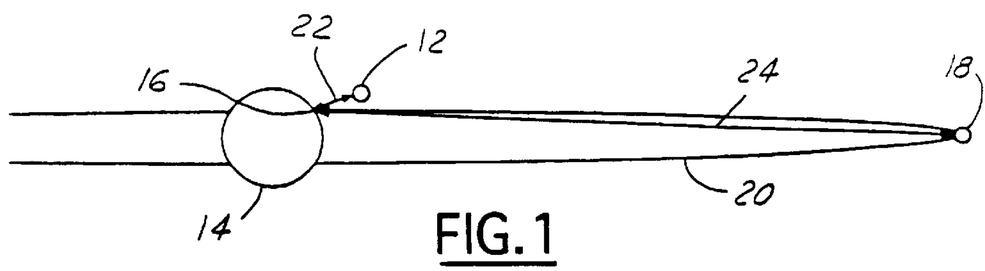
FIG. 1 is a high level system diagram relative of a preferred embodiment in the invention to the Earth of a preferred embodiment in the invention.

In the following figures the same reference numerals are used to identify the same components in the various views.

The present invention is applicable to many communications systems including various mobile, fixed, point-to-point broadcast and other types of communications.

Referring now to FIG. 1, the present invention is a communications system 10 that employs a stratospheric platform 12 positioned above Earth 14. Stratospheric platform 12 communicates with a user 16 positioned on Earth 14. A geosynchronous satellite 18 having a geosynchronous orbit 20 is also illustrated. The geosynchronous orbit 20 allows the geosynchronous satellite 18 to maintain a relatively fixed position above a particular point on the Earth. Although only one stratospheric platform 12 and one geosynchronous orbit satellite 18 are illustrated, the present invention may include several of each.

As illustrated, the line of sight 22 of stratospheric platform 12 has a significantly different elevation angle than line-of-sight 24. As will be illustrated below, the line-of-sight corresponds to different elevation angles relative to user 16. The difference in line-of-sights 22,24 allows frequency reuse between geosynchronous satellite 18 and stratospheric platform 12.

Stratospheric platform 12 may comprise one of many types of proposed stratosphere based devices such as unmanned plane, balloons, dirigibles or the like. Stratospheric platform 12 preferably may also comprise a stratosphere-based platform such as those under development by AeroVironment. Helios is one such project being developed by AeroVironment. The Helios stratospheric platform is an unmanned vehicle that can fly for several months at an altitude of about 60,000 feet above the Earth. Helios is a solar powered electric plane that is modular in design and may be configured to carry a variety of payloads. Stratospheric platforms also deploy relatively rapidly compared to satellites and thus, if the need increases, the system capability may be increased or modified.

Figure 2:
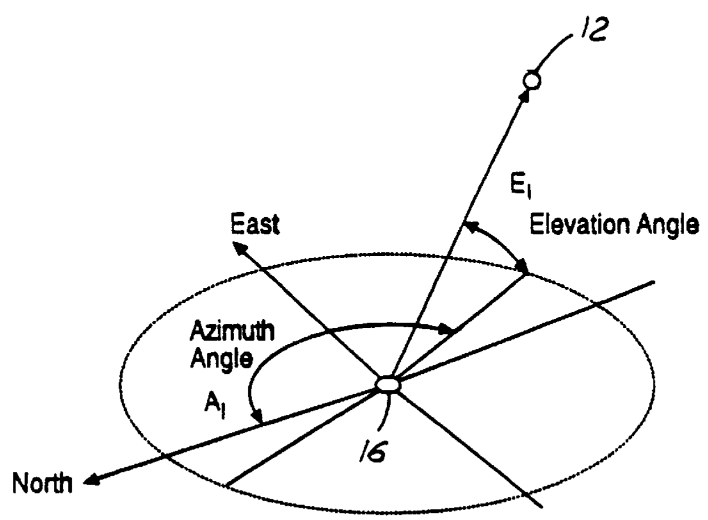
FIG. 2 is a plot illustrating various angles of the satellite systems according to FIG. 1.

Referring now to FIG. 2, stratospheric platform 12 is illustrated having an elevation angle $E_1$ with respect to the user 16. Also, the azimuth angle $A_1$ of stratospheric platform 12 is also illustrated. Azimuth angle $A_1$ is the angle from north. Although different, the azimuth angle and elevation angle for a satellite 18 is equally applicable. Of course, the elevation angle and azimuth angle for stratospheric platform 12 will vary depending on its location that may vary depending on the stratospheric platform 12. Of course, the height of the stratospheric platform must also be taken in consideration.

Figure 3:
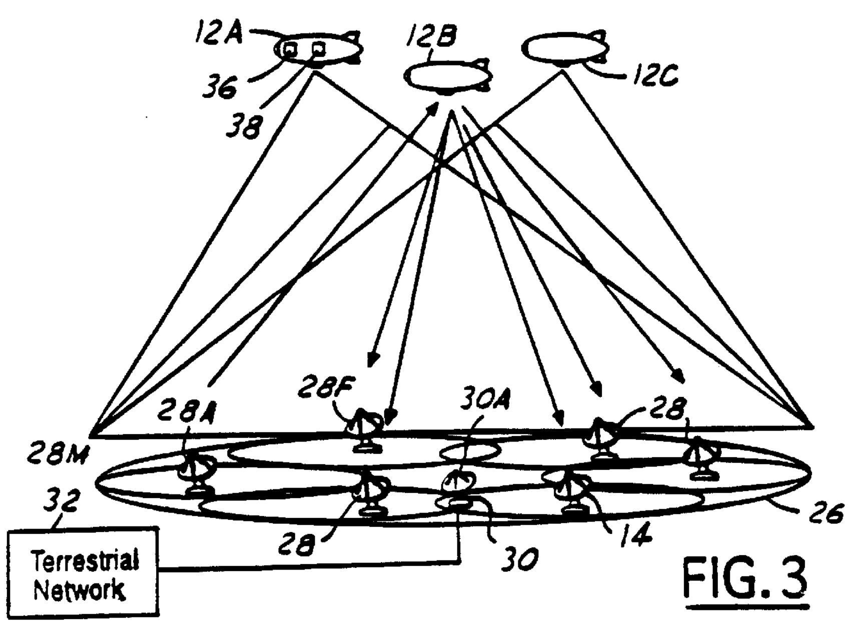
FIG. 3 is a system diagram of a preferred embodiment in the invention.

Referring now to FIG. 3, communications system 10 having a plurality of platforms 12A, 12B and 12C is used to cover a predetermined service area 26 on the Earth's surface. Although three are used for illustrative purposes, only one is required. A plurality of user terminals 28 are used to illustrate mobile users and fixed users respectively. Mobile user terminals 28M may comprise but are not limited to automotive applications, personal digital assistant applications, and cellular phone applications. Fixed user terminals 28F may, for example, comprise business-based or home-based communications systems. Each user terminal 28F, 28M may receive a signal with a predetermined signal strength or receive an antenna radiation spot in a spot beam pattern that is available from and provided by stratospheric platform 12.

Communications system 10 further includes a gateway station 30 that is coupled to terrestrial networks 32 and a device operations center 34. Both gateway station 30 and device operations center 34 are in communication with platforms 12. Gateway station 30 provides a link between user terminals 28F, 28M and terrestrial networks 32 through stratospheric platform 12.

Device operations center 34 provides command and control functions to platforms 12A–12C. Although illustrated as two separate units, gateway station 30 and device operations center 34 may be combined into the same physical location.

The platforms 12A–12C are used as a communications node for gateway station 30 and user terminals 28M and 28F, each of which have antennas that are pointed in the direction of the platform. The gateway antenna 30A of gateway station 30 and user terminal antennas 28A has a beam width wide enough to maintain communication links with platform 12 throughout the flight path. The antennas 28A, 30A allow for large data throughput.

Platforms 12A–C each have a controller 36 that is used to control communications with the user terminals 28F, 28M. In the present invention, the controller 36 is used to generate a plurality of beams as is discussed below. The frequency of the beams may be within the spectrum of a geostationary satellite. Various numbers of users may communicate within a beam.

Controller 36 may be a secondary payload for the platforms. That is, to reduce system expense, the controllers 36 may be secondary to a primary controller 38 for another type of system already carried on the platform. The selective size and weight of controller 36 relative to controller 38 may be kept small to reduce the burden on platform 12.

Referring now to FIG. 4A, an elevation plot illustrates user terminal 28 having an elevation angle EL1 with respect to a stratospheric platform at a position P1.

Referring now to FIG. 4, the elevation angle EL2 between a satellite 18 having a position P2 is illustrated. If FIGS. 4 and 4A are superimposed, a separation angle between points P1 and P2 with the user at the vertex will be formed. The separation angle is preferably above 4 degrees and preferably greater than 7 degrees. By providing the separation angle of at least a predetermined separation angle, the frequencies between the platform 12 and satellite 18 may be reused. By providing the separation angle greater than a predetermined angle, no interference will be formed between the transmitting and receiving beams of the respective satellite and stratospheric platform.

Of course, the azimuth angle AZ1 and the azimuth angle AZ2 also should be factored into the separation angle. That is, the separation angle is a function of both the azimuth angles AZ1, AZ2 and the elevation angles EL1 and EL2.

Referring now to FIG. 5, a blocking area 50 is defined over service area 26. Blocking area 50 corresponds to an area where the separation angle between the satellite and the stratospheric platform is below a predetermined value. In this case, the blocking area forms a continuous band. In this case, the area between the satellite and the stratospheric platform is greater than 7 degrees in the service area. Within the blocking area the separation angle is less than 7 degrees. Thus, the stratospheric platform does not transmit beams into the service area.

Figure 6:
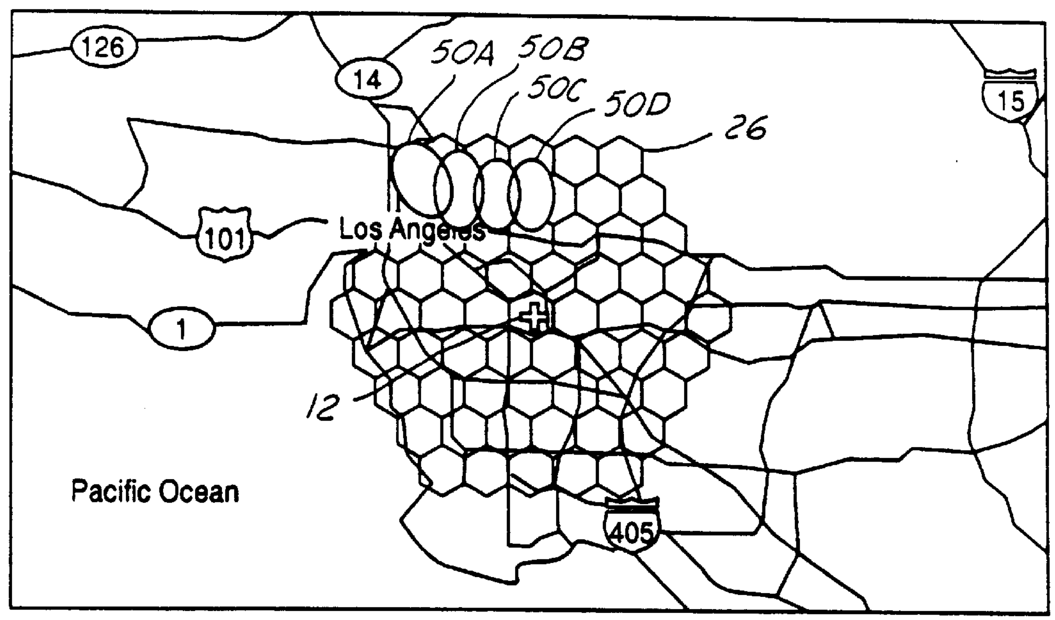
FIG. 6 is a plot of the Los Angeles area having blocking areas corresponding to known geostationary satellites.

Referring now to FIG. 6, a plot of a service area 26 over the Los Angeles area is illustrated having four blocking areas 50A, 50B, 50C, and 50D. Blocking areas 50A, 50B, 50C, and 50D correspond to areas in which the separation angle between beams from a stratospheric platform 12 and beams from satellites located at geostationary locations West 91, West 100, West 109, and West 118, respectively.

Figure 7:
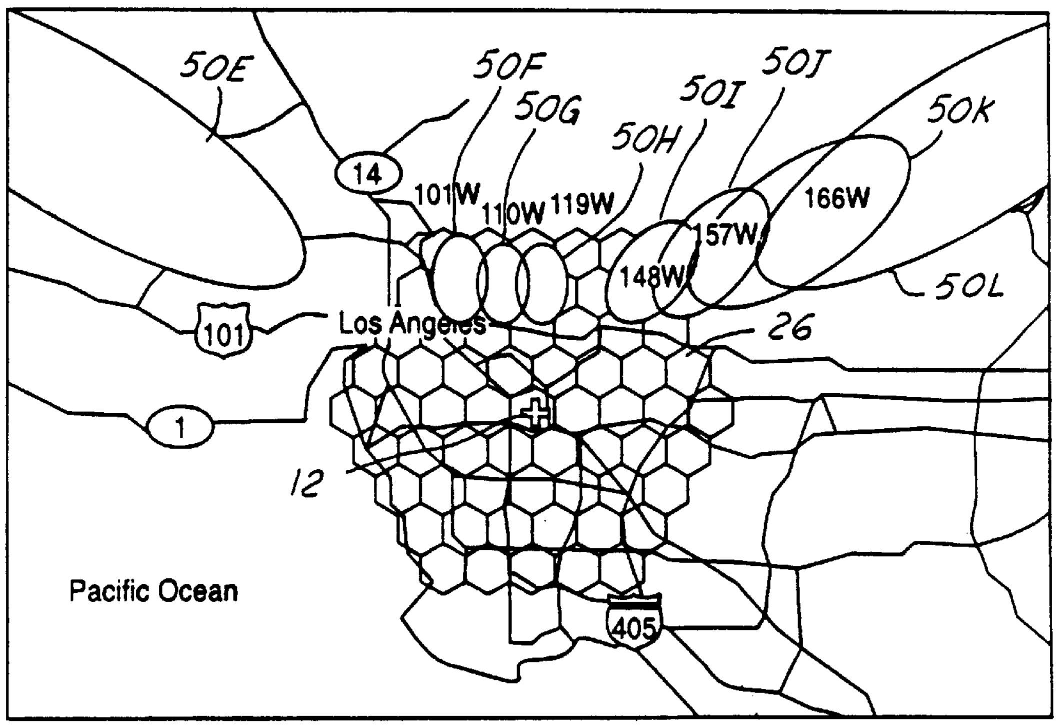
FIG. 7 is a plot of the Los Angeles area illustrating blocking areas of several geostationary satellites.

Referring FIG. 7, a plot of the Los Angeles area illustrating the position of stratospheric platform 12 with respect to service area 26 is illustrated. A plurality of block areas 50E–50L are illustrated. Blocking areas 50E–50L correspond to direct broadcasting satellites in geostationary orbit. The blocking areas correspond to satellites located at 61.5 West, 101 West, 110 West, 119 West, 148 West, 157 West, 166 West, and 175 West, respectively.

Figure 8:
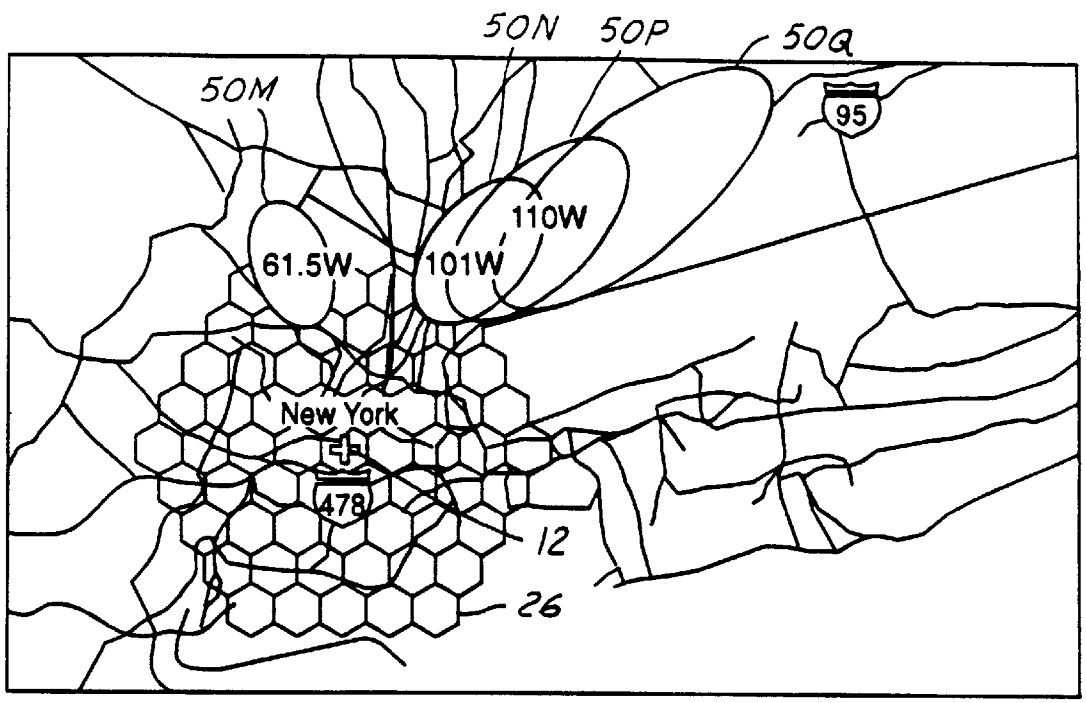
FIG. 8 is a plot of the New York area illustrating blocking areas with known geostationary satellites.

Referring now to FIG. 8, blocking areas 50M, 50N, 50P, and 50Q, are positioned over a service area 26 of the New York area. The blocking areas 50M, 50N, 50P, 50Q correspond respectively to satellites located in geostationary orbit located at 61.5 West, 101 West, 110 West, and 119 West.

In operation, a user located within the service area 26 but outside the blocking area 50M will receive signals from both satellite 18 and stratospheric platform 12. For user terminals located within blocking area 50, the user terminals therein will receive signals only from one of either the satellite 18 or stratospheric platform 12. In actuality, it is more likely that the satellite 18 will have priority over stratospheric platform 12. Thus, users within the blocking area 50 will receive signals only from satellite 18. The separation angle that is used to define the blocking area may vary. However, it is preferred that the separation angle between the position of the stratospheric platform and the satellite be at least 4 degrees due to limitations in communications circuitry.

While particular embodiments of the invention have been shown and described, numerous variations alternate embodiments will occur to those skilled in the art. Accordingly, it is intended that the invention be limited only in terms of the appended claims.

What is claimed is:

1. A communication system for use with a geosynchronous satellite broadcasting a first beam at a first frequency comprising:

a first stratospheric platform having a substantially fixed separation angle with respect to the satellite, said first stratospheric platform generating a second beam having the first frequency to a service area, said stratospheric platform defining a geographically fixed blocking area as a function of the separation angle, said stratospheric platform not generating said second beam within the blocking area; and user terminals outside the blocking area configured to receive the first beam and the second beam.

2. A system as recited in claim 1 wherein said user terminals comprise directional antennas.

3. A system as recited in claim 1 further comprising a second stratospheric platform generating a third beam having the first frequency.

4. A system as recited in claim 3 wherein said user terminals receive signals from and transmit signals to said first stratospheric platform and said second stratospheric platform.

5. A system as recited in claim 1 wherein the second beam is generated from a secondary payload.

6. A system as recited in claim 1 wherein the blocking area has the separation angle between a first position of said stratospheric platform and a second position of the satellite less than a predetermined angle.

7. A system as recited in claim 6 wherein said predetermined angle is about 4 degrees.

8. A system as recited in claim 6 wherein said predetermined angle is about 7 degrees.

9. A communication system for use with a system of geosynchronous satellites broadcasting a first beam at a first frequency, said geosynchronous satellites having a first position above a service area, comprising:

a first stratospheric platform having a substantially fixed second position above a service area having a primary payload, said first stratospheric platform generating communication signals having the first frequency, a geographically fixed blocking area having a substantially fixed separation angle between said first position and second position less than a predetermined angle, said first stratospheric platform providing the communication signals to the service area outside the blocking area.

10. A system as recited in claim 9 further comprising user terminals having directional antennas.

11. A system as recited in claim 9 further comprising a second stratospheric platform generating a second beam having the first frequency.

12. A system as recited in claim 9 wherein the communication signals are generated from a secondary payload.

13. A system as recited in claim 9 wherein said predetermined angle is about 4 degrees.

14. A system as recited in claim 9 wherein said predetermined angle is about 7 degrees.

15. A method for operating a communications system having a stratospheric platform coordinating with a satellite, said method comprising the steps of:

defining a service area having a geographically fixed blocking area therein, said blocking area having a substantially fixed separation angle between a first position of the satellite and a second position of the stratospheric platform less than a predetermined angle;

generating a first beam using a first frequency directed at the service area with the satellite; and generating a second beam using the first frequency directed at the service area outside the blocking area from the stratospheric platform.

16. A method as recited in claim 15 wherein said step of generating a second beam comprises the step of generating a second beam from a secondary payload.

17. A method as recited in claim 15 wherein said satellite comprises a geostationary satellite.

18. A method as recited in claim 15 further comprising the step of generating a feeder link.

* * * * *